United States Patent
Zhou et al.

(10) Patent No.: US 10,575,600 B2
(45) Date of Patent: Mar. 3, 2020

(54) SMART ZIPPER AND GARMENT

(71) Applicant: BOE TECHNOLOGY GROUP CO., LTD., Beijing (CN)

(72) Inventors: Zhigang Zhou, Beijing (CN); Liang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/936,294

(22) Filed: Mar. 26, 2018

(65) Prior Publication Data
US 2019/0053583 A1 Feb. 21, 2019

(30) Foreign Application Priority Data
Aug. 21, 2017 (CN) .......................... 2017 1 0717665

(51) Int. Cl.
*A44B 19/34* (2006.01)
*A44B 19/26* (2006.01)
(Continued)

(52) U.S. Cl.
CPC ............ *A44B 19/34* (2013.01); *A43B 3/0005* (2013.01); *A43C 11/12* (2013.01); *A44B 19/02* (2013.01);
(Continued)

(58) Field of Classification Search
CPC ....... A44B 19/34; A44B 19/02; A44B 19/262; H04B 1/40; H04B 1/385; G01B 2210/58;
(Continued)

(56) References Cited

U.S. PATENT DOCUMENTS

2006/0164280 A1* 7/2006 Nehls ..................... G08C 17/02
  341/176
2018/0325223 A1* 11/2018 Huang ................... A44B 19/24

FOREIGN PATENT DOCUMENTS

CN 101053459 10/2007
CN 203467826 3/2014
(Continued)

OTHER PUBLICATIONS

"First office action," CN Application No. 201710717665.8 (dated Sep. 3, 2019).

*Primary Examiner* — Melissa J Koval
*Assistant Examiner* — Trung Nguyen
(74) *Attorney, Agent, or Firm* — Womble Bond Dickinson (US) LLP (57) ABSTRACT

A smart zipper includes: a fastener stringer including two rows of zipper teeth and a joint at one end of the two rows of zipper teeth for fixedly connecting the one end of the two rows of zipper teeth; a slider, including two lateral limiting portions, the two lateral limiting portions having conductive properties, and the two lateral limiting portions respectively electrically contacting outer edges of the two rows of zipper teeth; and a resistance measuring chip electrically connected to the two lateral limiting portions of the slider respectively, wherein the resistance measuring chip, the slider and the fastener stringer form a conductive loop. The resistance measuring chip is used for measuring the resistance value of the conductive loop, and outputting a measurement signal. The smart zipper provided by the present disclosure can detect its own closed state. Therefore, the user can know the closed state of the zipper in real time to avoid embarrassment or property loss due to unclosed zipper.

18 Claims, 5 Drawing Sheets

(51) Int. Cl.
| | |
|---|---|
| *G01B 7/02* | (2006.01) |
| *A43C 11/12* | (2006.01) |
| *H04B 1/3827* | (2015.01) |
| *A44B 19/02* | (2006.01) |
| *A43B 3/00* | (2006.01) |
| *A41B 9/00* | (2006.01) |
| *A44C 5/00* | (2006.01) |
| *H04B 1/40* | (2015.01) |

(52) U.S. Cl.
CPC .............. *A44B 19/262* (2013.01); *G01B 7/02* (2013.01); *H04B 1/385* (2013.01); *A41B 9/001* (2013.01); *A41B 2300/322* (2013.01); *A44C 5/0015* (2013.01); *G01B 2210/58* (2013.01); *H04B 1/40* (2013.01)

(58) Field of Classification Search
CPC ......... G01B 7/02; A43B 3/0005; A43C 11/12; A41B 9/001; A41B 2300/322; A44C 5/0015
USPC ....... 324/600, 693, 415, 421, 500, 525, 549, 324/691, 727; 439/65, 285, 488–492, 439/290, 291; 24/381, 403, 413, 414, 24/415, 430
See application file for complete search history.

(56) References Cited

FOREIGN PATENT DOCUMENTS

| | | |
|---|---|---|
| CN | 105167339 | 12/2015 |
| CN | 105737861 | 7/2016 |
| CN | 205409990 | 8/2016 |
| CN | 205757623 | 12/2016 |

\* cited by examiner

SMART ZIPPER AND GARMENT

RELATED APPLICATION

This application claims the benefit of a Chinese Patent Application No. 201710717665.8, filed on Aug. 21, 2017, the entire content of which application is incorporated herein by reference.

FIELD OF THE DISCLOSURE

The present disclosure relates to the field of zipper technology, and in particular, to a smart zipper and a garment.

BACKGROUND OF THE DISCLOSURE

Zipper, also known as zip-fastener, is one of the top ten inventions that make life convenient for people in modern times. At present, in everyday life, zippers are used on many items in many occasions, for example, carry-on bags, wearing garment, outdoor tents, etc. Zipper opening and closing operations are very convenient, but also because of this characteristic, in life, they are often easily overlooked. The zipper may be forgotten to close, or the zipper may be not completely closed, or the zipper may be pried open by others and the user does not find such situations, which can easily lead to embarrassing scenes or financial losses situation.

SUMMARY OF THE DISCLOSURE

The present disclosure discloses a smart zipper capable of detecting its own closed state.

To achieve the above object, the present disclosure provides the following technical solutions:

a smart zipper, comprising:

a fastener stringer including two rows of zipper teeth and a joint at one end of the two rows of zipper teeth for fixedly connecting one end of the two rows of zipper teeth;

a slider, comprising two limiting portions; the two limiting portions having conductive properties, and the two limiting portions respectively electrically contacting outer edges of the two rows of zipper teeth; and a resistance measuring chip connected to the two limiting portions of the slider respectively, and the resistance measuring chip, the slider and the fastener stringer form a conductive loop, the resistance measuring chip is used for measuring the resistance value of the conductive loop and outputting a measurement signal.

In the above smart zipper, the resistance measuring chip is electrically connected with two limiting portions of the slider respectively, the two limiting portions of the slider are in electrical contact with the outer edges of two rows of the zipper teeth in the fastener stringer, respectively, and the resistance measuring chip, the slider and the fastener stringer form the conductive loop. In addition, the resistance of the conductive loop changes with the electrically contacted position of the two limiting portions of the slider with the outer edges of the two rows of zipper teeth, that is, the resistance of the conductive loop changes with the change of the meshed length of two rows of zipper teeth. The resistance of the conductive loop is measured by the resistance measuring chip, and the meshed length of the two rows of the zipper teeth of the zipper (namely, information of the closed state of the zipper) can be obtained according to the measurement signal output by the resistance measuring chip. Therefore, the smart zipper provided by the present disclosure can detect its own closed state. In addition, the user can know the closed state of the zipper in real time to prevent embarrassment or property loss caused by unclosed zipper.

Optionally, in the fastener stringer, each of the zipper teeth in the fastener stringer is a conductor; the resistance measuring chip, the two limiting portions of the slider, and the meshed portion of the two rows of the zipper teeth form the conductive loop.

Optionally, in the fastener stringer, the outer edge of each row of the zipper teeth in the fastener stringer has conductive property, and the joint is a conductor; the resistance measuring chip, the two limiting portions of the slider, the outer edges of the two rows of the zipper teeth, and the joint together form the conductive loop.

Optionally, the smart zipper further includes: a wireless signal transceiver module which is signally connected with the resistance measuring chip and is used to receive the measurement signal output by the resistance measuring chip and send the measurement signal to an external device.

Optionally, the wireless signal transceiver module is a Bluetooth module.

Optionally, the external device is a smart bracelet or a smart phone.

Optionally, the smart zipper further comprises: a button cell which is electrically connected with the resistance measuring chip and the wireless signal transceiver module for supplying power to the resistance measuring chip and the wireless signal transceiver module.

Optionally, the resistance measuring chip, the wireless signal transceiver module and the button cell are all disposed in the slider.

Optionally, the smart zipper further includes a pull tab, wherein the pull tab comprises two hooks that are not in contact with each other. The slider further comprises a connecting portion for connecting the pull-tab, the connecting portion is respectively provided with buckles at two sides facing the two limiting portions, the two buckles are respectively engaged with two hooks.

Optionally, the two hooks of the pull tab have conductive properties; the resistance measuring chips are respectively electrically connected with the two limiting portions of the slider through the two hooks of the pull tab, and the resistance measuring chip, the pull tab, the slider and the fastener stringer form the conductive loop.

Optionally, the resistance measuring chip, the wireless signal transceiver module and the button cell are all disposed in the pull tab.

The present disclosure further provides a garment, including the smart zipper described in any one of the above technical solutions.

DETAILED DESCRIPTION OF THE DISCLOSURE

The technical solutions in the embodiments of the present disclosure are clearly and completely described below with reference to the accompanying drawings in the embodiments of the present disclosure. Apparently, the described embodiments are merely a part but not all of the embodiments of the present disclosure. All other embodiments obtained by persons of ordinary skill in the art based on the embodiments of the present disclosure without creative efforts shall fall within the protection scope of the present disclosure.

Please refer to FIG. 1 to FIG. 7.

As shown in FIG. 1 to FIG. 3 and FIG. 6, a smart zipper includes:

a fastener stringer 1 including two rows of zipper teeth 2 and a joint 4 at one end of the two rows of zipper teeth 2 for fixedly connecting the one end of the two rows of zipper teeth 2;

a slider 3, comprising two limiting portions 31; the two limiting portions 31 having conductive properties, and the two limiting portions 31 respectively electrically contacting outer edges of the two rows of zipper teeth 2; and a resistance measuring chip 5 connected to the two lateral limiting portions 31 of the slider 3 respectively, and the resistance measuring chip 5, the slider 3 and the fastener stringer 1 form a conductive loop (the loop shown by dark thick line in FIG. 2 and FIG. 3), the resistance measuring chip 5 is used for measuring the resistance value of the conductive loop and outputting a measurement signal.

In the above smart zipper, the resistance measuring chip 5 is electrically connected with two lateral limiting portions 31 of the slider 3 respectively, the two lateral limiting portions 31 of the slider 3 are in electrical contact with the outer edges of two rows of the zipper teeth 2 in the fastener stringer, respectively, and the resistance measuring chip 5, the slider 3 and the fastener stringer 1 form the conductive loop. In addition, the resistance of the conductive loop changes with the electrically contacted position of the two lateral limiting portions 31 of the slider 3 with outer edges of the two rows of zipper teeth 31, that is, the resistance of the conductive loop changes with the change of the meshed length of two rows of zipper teeth 2. The resistance of the conductive loop is measured by the resistance measuring chip 5, and the meshed length of the two rows of the zipper teeth 2 of the zipper can be obtained according to the measurement signal output by the resistance measuring chip 5. Therefore, the smart zipper provided by the present disclosure can detect its own closed state. In addition, the user can know the closed state of the zipper in real time to prevent embarrassment or property loss caused by unclosed zipper.

Figure 2:
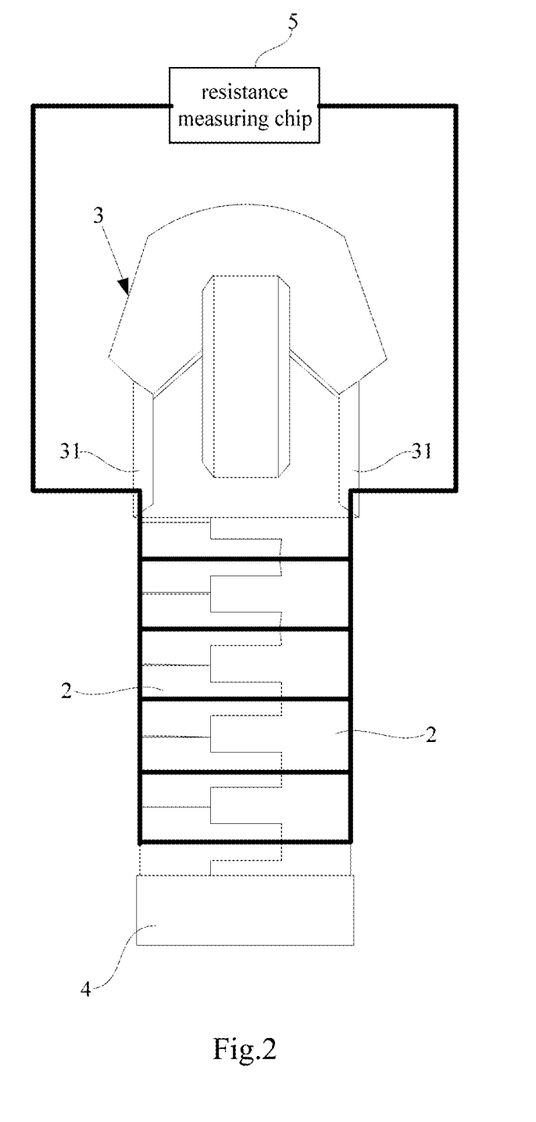
FIG. 2 is a schematic structural view of a closed portion of a smart zipper according to an embodiment of the present disclosure.

As shown in FIG. 2, in a specific embodiment, in a smart zipper provided by an embodiment of the present disclosure, each of the zipper teeth 2 in the fastener stringer is a conductor; the resistance measuring chip 5, the two lateral stop portions 31 of the slider 3, and the meshed portion of the two rows of the zipper teeth 2 form the conductive loop (the loop shown by dark thick line in FIG. 2).

Figure 4:
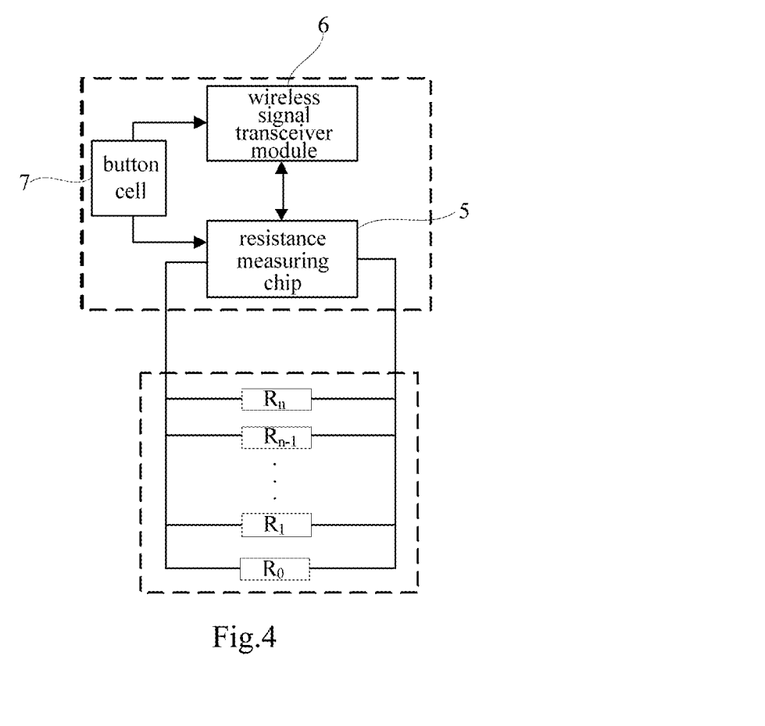
FIG. 4 is a schematic structural view of an equivalent detection circuit of the smart zipper shown in FIG. 2.

In the smart zipper provided by an embodiment of the present disclosure, each zipper teeth 2 is a small conductor. In addition, the meshed portion where two rows of zipper teeth 2 are meshed with each other may be equivalent to a plurality of resistors connected in parallel. As shown in FIG. 4, the meshed portion of the two rows of zipper teeth 2 can be equivalent to a circuit in which the resistors R0 to Rn are connected in parallel with each other. Further, as the meshed portion of the two rows of the zipper teeth 2 become longer, it is equivalent to the gradually increased number of resistors connected in parallel. In this way, the resistance of the meshed portion will be reduced. Furthermore, the resistance of the entire conductive loop formed by the resistance measuring chip 5, the two lateral limiting portions 31 of the slider 3, and the meshed portion of the two rows of the zipper teeth 2 will also be reduced. Therefore, the closed degree of the zipper can be judged by the resistance value measured by the resistance measuring chip 5.

According to an aspect of the present disclosure, the peripheral edges of the zipper teeth 2 has good conductive properties, so as to ensure good electrical contact between the meshed zipper teeth 2, between the outer edge of the zipper teeth 2 and the limiting portion 31 of the slider 3.

Figure 3:
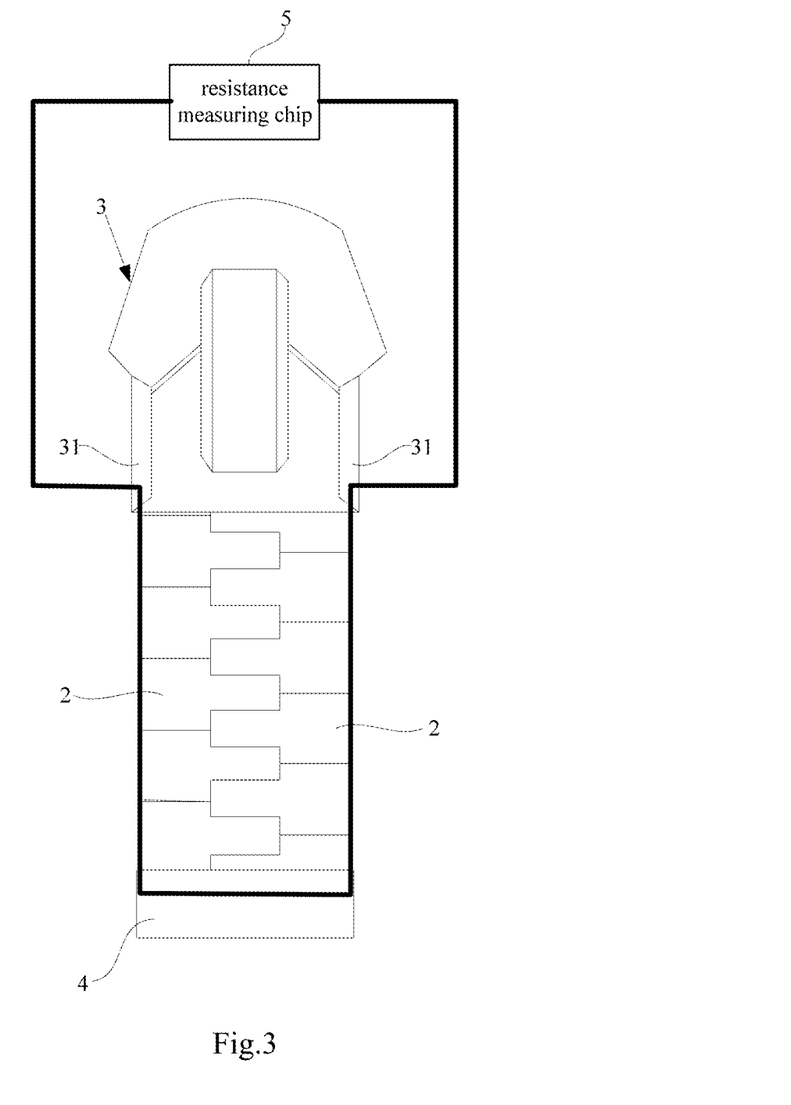
FIG. 3 is a schematic structural view of a closed portion of a smart zipper according to another embodiment of the present disclosure.

As shown in FIG. 3, in another specific embodiment, in a smart zipper according to an embodiment of the present disclosure, the outer edge of each row of the zipper teeth 2 has conductive property (only the outer edge of each of the zipper teeth 2 is a conductor). That is, the bottom of each of the zipper teeth 2 is electrically conductive and the meshed portion of the two rows of the zipper teeth 2 is not electrically conducted. For each row of zipper teeth 2, the outer edges (i.e., the bottoms) of the two adjacent teeth 2 after meshing are also electrically conducted. In addition, the joint 4 connected to one end of the two rows of the mike teeth 2 is a conductor. Further, the resistance measuring chip 5, the two lateral limiting portions 31 of the slider 3, the outer edges of the two rows of the zipper teeth 2, and the joint 4 can form a conductive loop (loop as shown by the thick black line in FIG. 3).

Figure 5:
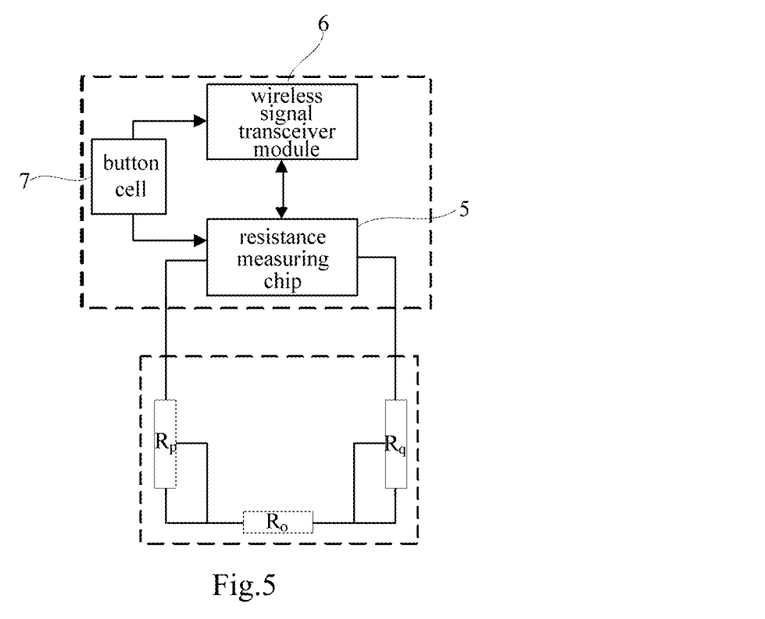
FIG. 5 is a schematic structural view of an equivalent detection circuit of the smart zipper shown in FIG. 3.

In the smart zipper according to the embodiment of the present disclosure, the outer edge of each row of the zipper teeth 2 and the joint 4 connected to one end of the two rows of the zipper teeth 2 are electrically conductive, and further, the joint 4 is electrically contacted with the outer edges of the two rows of the zipper teeth 2. Then, the joint 4 and the outer edges of the two rows of the zipper teeth 2 may be equivalent to a plurality of resistors connected in series with each other. As shown in FIG. 5, the joint 4 is electrically contacted with the outer edges of the two rows of the zipper teeth 2, which is equivalent to a circuit in which the resistors $R_p$, $R_o$ and $R_q$ are connected to each other in series. Since the joint 4 is located at the beginning end of the meshed portion of the two rows of the zipper teeth 2, the two lateral limiting portions 31 of the slider 3 are located at the terminating end of the meshed portion of the two rows of the zipper teeth 2. Therefore, only the outer edges of the two rows of the zipper teeth 2 are connected in the conductive loop. In addition, the outer edge of each row of the zipper teeth 2 can be equivalent to a sliding resistor. For example, the outer edges of the two rows of the zipper teeth 2 may be respectively equivalent to sliding resistors $R_p$ and $R_q$ shown in FIG. 5. As the meshed portion of the two rows of zipper teeth 2 becomes longer, it is equivalent to a gradually increased resistance of the sliding resistors $R_p$ and $R_q$ connected in the conductive loop. In this case, the resistance of the conductive loop will also increase; thus, the closed degree of the zipper can be judged by the resistance detected by the resistance measuring chip 5.

As shown in FIG. 4 and FIG. 5, in a specific embodiment, the smart zipper provided by an embodiment of the present disclosure may further include a wireless signal transceiver module 6 which is signally connected with the resistance measuring chip 5 and is used to receive the measurement signal output by the resistance measuring chip 5 and send the measurement signal to an external device. Furthermore, the measurement result of the resistance measuring chip 5 may be analyzed by the external device, and the analysis result may be displayed or output in voice by the external device. For example, the external device may optionally output the closed state of the zipper through on-screen display, and/or voice, and/or vibration, etc., to prompt the user for the closed state of the zipper.

As shown in FIG. 4 and FIG. 5, the wireless signal transceiver module 6 may be a Bluetooth module.

Further, the external device may be a smart bracelet or a smart phone. Of course, the external device is not limited to a bracelet or a cell phone and may also be other electronic products.

Specifically, when the resistance measuring chip 5 is in working state, the resistance can be measured by scanning in real time and the result is sent to the external device in real time through the wireless signal transceiver module 6. The external device may include an operation module and a control module, and the external device can perform a comparative analysis on the signal output by the resistance measuring chip 5 through the operation module, and according to the analysis result, the external device can also control the output of the signal through the control module to prompt the user for the closed state of the user's zipper.

As shown in FIG. 4 and FIG. 5, the smart zipper provided by the embodiment of the present disclosure may further include a button cell 7. Specifically, the button cell 7 is electrically connected to the resistance measuring chip 5 and the wireless signal transceiver module 6 for supplying power to the resistance measuring chip 5 and the wireless signal transceiver module 6.

As shown in FIG. 1 to FIG. 6, the resistance measuring chip 5 may be disposed in the slider 3 so as to be electrically connected directly with the two lateral limiting portions 31 of the slider 3. Further, the wireless signal transceiver module 6 and the button cell 7 may also be integrated in the slider 3 to facilitate the connection with the resistance measuring chip 5.

Figure 1:
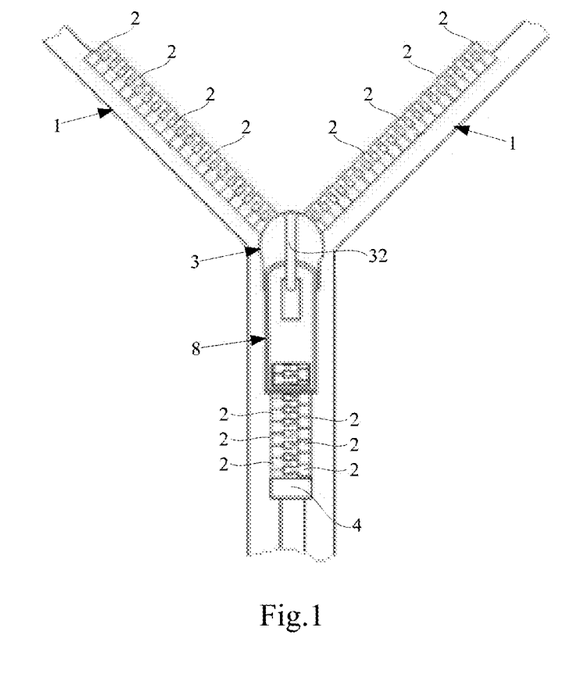
FIG. 1 is a schematic structural view of a smart zipper according to an embodiment of the present disclosure.
Figure 6:
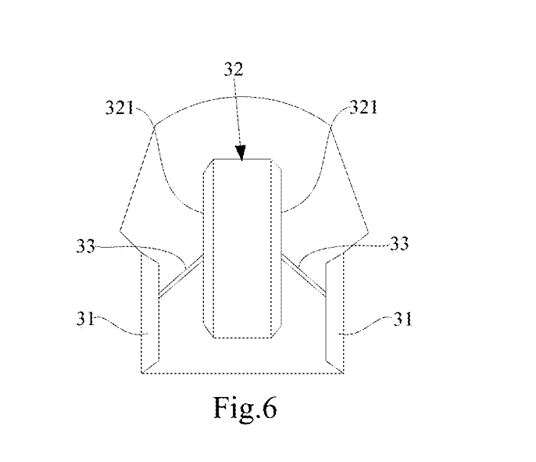
FIG. 6 is a schematic structural view of a slider of a smart zipper according to an embodiment of the present disclosure.
Figure 7:
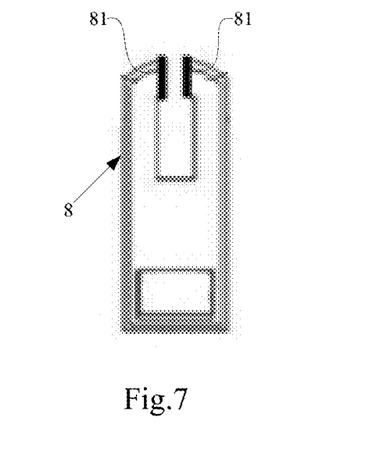
FIG. 7 is a schematic structural view of a pull tab of a smart zipper according to an embodiment of the present disclosure.

As shown in FIG. 1 and FIG. 7, the smart zipper provided by the embodiment of the present disclosure may further include a pull tab 8. Specifically, the pull tab 8 includes two hooks 81 that are not in contact with each other. Further, as shown in FIG. 1, FIG. 6 to FIG. 7, the slider 3 further includes a connecting portion 32 for connecting the pull tab 8, the connecting portion 32 is provided with buckles 321 at two sides facing the two limiting portions 31, the two buckles 321 can be engaged with the two hooks 81 of the pull tab 8, respectively.

As shown in FIG. 1 to FIG. 3 and FIG. 6 to FIG. 7, the two hooks 81 of the pull tab 8 both have conductive properties. Further, in the slider 3, the buckle 321 on each side and the limiting portion 31 on the corresponding side are electrically connected by a wire 33. Furthermore, the resistance measuring chip 5 can respectively achieve the electrical connection between the two limiting portions 31 of the slider 3 through the two hooks 81 of the pull tab 8, and then the resistance measuring chip 5, the two hooks 81 of the pull tab 8, the two limiting portions 31 of the slider 3, and the fastener stringer 1 form a conductive loop.

As shown in FIG. 1 to FIG. 5 and FIG. 7, the resistance measuring chip 5 may be further disposed in the pull-tab 8 to facilitate the electrical connection with the two hooks 81 of the pull-tab 8. Further, the wireless signal transceiver module 6 and the button cell 7 may also be integrated in the pull tab 8, in order to facilitate the connection with the resistance measuring chip 5.

As shown in FIG. 1 to FIG. 3 and FIG. 6 to FIG. 7, on the basis of the foregoing embodiments, as an example, in order to avoid short circuit, or the influence of static electricity and the like, in the smart zipper provided by the embodiments of the present disclosure, apart from the two lateral limiting portions 31 and the buckles 321 on both sides of the connecting portion 32 and the two wires 33, other portions are insulated in the structure of the slider 3; apart from the two hooks 81 in the pull tab 8, other portions in the pull tab 8 are insulated.

In addition, the embodiments of the present disclosure further provide a garment including the smart zipper in any one of the above embodiments.

Specifically, the garment provided by the embodiments of the present disclosure may include items such as underpants, shoes and luggage.

In the garment provided by the embodiments of the present disclosure, the closed state of the smart zipper can be detected; furthermore, the user can be informed of the closed state of the zipper in real time, so as to avoid embarrassment or property loss because the user forgets to zip the zipper or the zipper is not zipped completely or the zipper is pried open by others.

It should be noted that, the smart zipper provided by the embodiments of the present disclosure is not limited to garment and can be applied to various items requiring zipper.

Obviously, those skilled in the art can make various modifications and variations to the embodiments of the present disclosure without departing from the spirit and scope of the disclosure. In this way, if these modifications and variations of the disclosure fall within the scope of the claims of the disclosure and the equivalent technologies, the disclosure is also intended to include these modifications and variations.

The invention claimed is:

1. A smart zipper, comprising:
    a fastener stringer comprising two rows of zipper teeth and an electric nonconductive joint at one end of the two rows of zipper teeth for fixedly connecting the one end of the two rows of zipper teeth, wherein each of the zipper teeth has an electric conductive outer edge and an electric nonconductive meshed portion;
    a slider, comprising two lateral limiting portions; the two lateral limiting portions having conductive properties, and the two lateral limiting portions respectively electrically contacting outer edges of the two rows of zipper teeth; and
    a resistance measuring chip electrically connected to the two lateral limiting portions of the slider respectively,
    wherein, when the two rows of zipper teeth are at least partly meshed with each other, the resistance measuring chip, the two lateral limiting portions, the electric conductive outer edges of the at least partly meshed two rows of zipper teeth and the electric nonconductive joint together form a conductive loop, whereas the resistance measuring chip, the two lateral limiting portions and the electric nonconductive meshed portions of the at least partly meshed two rows of zipper teeth do not form a conductive loop, and wherein the resistance measuring chip is used for measuring a resistance value of the conductive loop and outputting a measurement signal.

2. The smart zipper according to claim 1, further comprising:

a wireless signal transceiver module which is signally connected with the resistance measuring chip and is used to receive measurement signals output by the resistance measuring chip and send the measurement signals to an external device.

3. The smart zipper according to claim 2, wherein the wireless signal transceiver module is a Bluetooth module.

4. The smart zipper according to claim 3, further comprising:

a button cell which is electrically connected with the resistance measuring chip and the wireless signal transceiver module for supplying power to the resistance measuring chip and the wireless signal transceiver module.

5. A garment comprising the smart zipper of claim 2.

6. The smart zipper according to claim 2, wherein the external device is a smart bracelet or a smart phone.

7. The smart zipper according to claim 6, further comprising:

a button cell which is electrically connected with the resistance measuring chip and the wireless signal transceiver module for supplying power to the resistance measuring chip and the wireless signal transceiver module.

8. The smart zipper according to claim 2, further comprising:

a button cell which is electrically connected with the resistance measuring chip and the wireless signal transceiver module for supplying power to the resistance measuring chip and the wireless signal transceiver module.

9. The smart zipper according to claim 8, further comprising a pull tab, wherein the pull tab comprises two hooks that are not in contact with each other;

the slider further comprises a connecting portion for connecting the pull-tab, the connecting portion is provided with two buckles respectively at two sides facing the two limiting portions, the two buckles are respectively engaged with the two hooks of the pull tab.

10. The smart zipper according to claim 9, wherein in the slider, the buckle at each side of the connecting portion is electrically connected with the limiting portion at a corresponding side;

the two hooks of the pull tab have conductive properties;

the resistance measuring chips are respectively electrically connected with the two limiting portions of the slider through the two hooks of the pull tab, and the resistance measuring chip, the pull tab, the slider and the fastener stringer form the conductive loop.

11. The smart zipper according to claim 10, wherein the resistance measuring chip, the wireless signal transceiver module and the button cell are all disposed in the pull tab.

12. The smart zipper according to claim 9, wherein the resistance measuring chip, the wireless signal transceiver module and the button cell are all disposed in the pull tab.

13. A garment comprising the smart zipper of claim 12.

14. The smart zipper according to claim 9, wherein apart from the two lateral limiting portions, the buckles and two wires, other portions of the slider are insulated; apart from the two hooks, other portions of the pull tab are insulated.

15. The smart zipper according to claim 8, wherein the resistance measuring chip, the wireless signal transceiver module and the button cell are all disposed in the slider.

16. A garment comprising the smart zipper of claim 15.

17. A garment comprising the smart zipper of claim 1.

18. The smart zipper according to claim 1, wherein only the outer edges of the two rows of the zipper teeth are electrically connected to the conductive loop, the outer edge of each row of the zipper teeth is equivalent to a sliding resistor, as a meshed length of the at least partly meshed two rows of zipper teeth becomes longer, a resistance of the sliding resistor electrically connected to the conductive loop gradually increases and a resistance of entire conductive loop also increases.

* * * * *